US010223575B2

(12) United States Patent
Kitamura et al.

(10) Patent No.: US 10,223,575 B2
(45) Date of Patent: Mar. 5, 2019

(54) MEASUREMENT APPARATUS FOR MEASURING SHAPE OF OBJECT, SYSTEM AND METHOD FOR PRODUCING ARTICLE

(71) Applicant: CANON KABUSHIKI KAISHA, Tokyo (JP)

(72) Inventors: Tsuyoshi Kitamura, Utsunomiya (JP); Akihiro Hatada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 15/202,966

(22) Filed: Jul. 6, 2016

(65) Prior Publication Data
US 2017/0008169 A1  Jan. 12, 2017

(30) Foreign Application Priority Data

Jul. 9, 2015  (JP) .................................. 2015-138157

(51) Int. Cl.
G06K 9/00  (2006.01)
G01B 11/25  (2006.01)
G06K 9/46  (2006.01)
B25J 9/16  (2006.01)

(52) U.S. Cl.
CPC ...... G06K 9/00201 (2013.01); G01B 11/2513 (2013.01); B25J 9/1697 (2013.01); G05B 2219/40564 (2013.01); G06K 2209/401 (2013.01); Y10S 901/47 (2013.01)

(58) Field of Classification Search
None
See application file for complete search history.

(56) References Cited

U.S. PATENT DOCUMENTS

| 2009/0059231 | A1* | 3/2009 | Fukazawa ............... G01B 11/25 356/369 |
| 2010/0008588 | A1* | 1/2010 | Feldkhun ........... G01B 11/2518 382/206 |
| 2010/0046802 | A1* | 2/2010 | Watanabe ............... G01S 17/36 382/106 |
| 2011/0205356 | A1* | 8/2011 | Kim ....................... G01B 11/25 348/135 |
| 2013/0238125 | A1* | 9/2013 | Suzuki ................... B25J 9/1612 700/253 |
| 2017/0112360 | A1* | 4/2017 | Tanaka ................... G01B 11/24 |

FOREIGN PATENT DOCUMENTS

| JP | 3-289505 A | 12/1991 |
| JP | 03289505 A * | 12/1991 |
| JP | 2002-213931 A | 7/2002 |

* cited by examiner

Primary Examiner — Sean M Conner
(74) Attorney, Agent, or Firm — Canon U.S.A., Inc. IP Division (57) ABSTRACT

A measurement apparatus includes an optical combining unit configured to optically combine light from a first light source and light from a second light source, a forming unit configured to form pattern light using light from the first light source, a projection optical system configured to project the optically combined light onto an object, an imaging unit configured to image the object on which the pattern light is projected to capture a first image and to image the object illuminated with light from the second light source via the projection optical system to capture a second image, and a processing unit configured to correct the first image using the second image and to obtain information on a shape of the object based on the corrected first image.

13 Claims, 8 Drawing Sheets

MEASUREMENT APPARATUS FOR MEASURING SHAPE OF OBJECT, SYSTEM AND METHOD FOR PRODUCING ARTICLE

BACKGROUND

Field

Aspects of the present invention generally relate to a measurement apparatus for measuring the shape of an object (an object to be measured), a system, and a method for producing an article.

Description of the Related Art

As one of techniques of measuring the shape of an object, there is known an optical measurement apparatus. The optical measurement apparatus can employ various methods, which include a method called a "pattern projection method". The pattern projection method is to find the shape of an object by projecting a predetermined pattern onto the object, capturing an image of the object having the predetermined pattern projected thereon to obtain a captured image, detecting a pattern in the captured image, and calculating distance information (range information) in each pixel position according to the principle of triangulation.

Such a measurement method detects coordinates of each line of the projected pattern based on spatial distribution information about the amounts of received light (pixel values) in the captured image. However, the spatial distribution information about the amounts of received light is data including influences of, for example, a reflectance distribution caused by a pattern or design of the surface of an object to be measured or a reflectance distribution caused by a fine-structure shape of the surface of an object to be measured. These influences may cause detection errors in detecting the coordinates of a pattern or may make it impossible to perform such detection itself, and, as a result, information on the calculated shape of an object to be measured may become less accurate.

On the other hand, a measurement method discussed in Japanese Patent Application Laid-Open No. 3-289505 projects pattern light onto an object to be measured using a liquid crystal shutter and acquires a captured image of the object having the pattern light projected thereon (hereinafter referred to as a "pattern projection image"), and then irradiates the object with uniform illumination light using the liquid crystal shutter and acquires a captured image of the object irradiated with the uniform illumination light (hereinafter referred to as a "uniform illumination image"). Then, the measurement method performs correction to remove, from the pattern projection image, an influence caused by a reflectance distribution of the surface of the object using data of the uniform illumination image as corrective data.

Furthermore, a measurement method discussed in Japanese Patent Application Laid-Open No. 2002-213931 irradiates an object with both pattern light and uniform illumination light which have respective polarization directions differing 90 degrees from each other and acquires a pattern projection image and a uniform illumination image using respective imaging units corresponding to the respective polarization directions, and then performs image processing to obtain distance information (range information) from a difference image between the pattern projection image and the uniform illumination image. This measurement method acquires the pattern projection image and the uniform illumination image at the same timing and performs correction to remove, from the pattern projection image, an influence caused by a reflectance distribution of the surface of the object.

The measurement method discussed in Japanese Patent Application Laid-Open No. 3-289505 acquires the pattern projection image and the uniform illumination image at different timings. In view of the intended use of a measurement apparatus, such a case can be seen where one of or both of an object to be measured and an imaging unit of the measurement apparatus are moving at the time of acquiring distance information. In this case, the relative positional relationship between them changes at the respective timings, so that the pattern projection image and the uniform illumination image become images captured from different points of view. In that case, if correction is performed using the images captured from different points of view, some errors may occur.

The measurement method discussed in Japanese Patent Application Laid-Open No. 2002-213931 uses two pieces of polarized light having respective polarization directions differing 90 degrees from each other, so that the pattern projection image and the uniform illumination image are acquired at the same timing. However, the surface of an object to be measured may have a local variation in angle due to a fine-structure shape (surface roughness) thereof, and such a local variation in angle may cause the reflectance distribution of the surface of the object to vary with polarization directions. This is because the reflectance of incident light with respect to the angle of incidence varies depending on polarization directions. Accordingly, if correction is performed using images containing information on mutually different reflectance distributions, some errors may occur.

SUMMARY

Aspects of the present invention are generally directed to a measurement apparatus capable of reducing a measurement error caused by a surface roughness of the surface of an object to be measured even in a case where the relative position between the object and a imaging unit of the measurement apparatus varies.

According to an aspect of the present invention, a measurement apparatus that measures a shape of an object includes a first light source configured to emit light of a first wavelength, a second light source configured to emit light of a second wavelength different from the first wavelength, an optical combining unit configured to optically combine light from the first light source and light from the second light source, a forming unit configured to form pattern light using light from the first light source, a projection optical system configured to project the optically combined light from the first light source and light from the second light source onto the object, an imaging unit configured to image the object which on the pattern light is projected by the projection optical system to capture a first image of the object formed from the pattern light reflected by the object, and a processing unit configured to obtain information of the shape of the object based on the first image, wherein the projection optical system is a common optical system configured to perform projection of light from the first light source and projection of light from the second light source, wherein the imaging unit images the object illuminated with light from the second light source via the projection optical system to capture a second image of the object formed from light emitted from the second light source and reflected by the object, and wherein the processing unit corrects the first image using the second image and obtains information of the shape of the object based on the corrected first image.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings. Furthermore, in the figures described below, the same members or elements are assigned the respective same reference numerals, and the duplicated description thereof is omitted.

Figure 1:
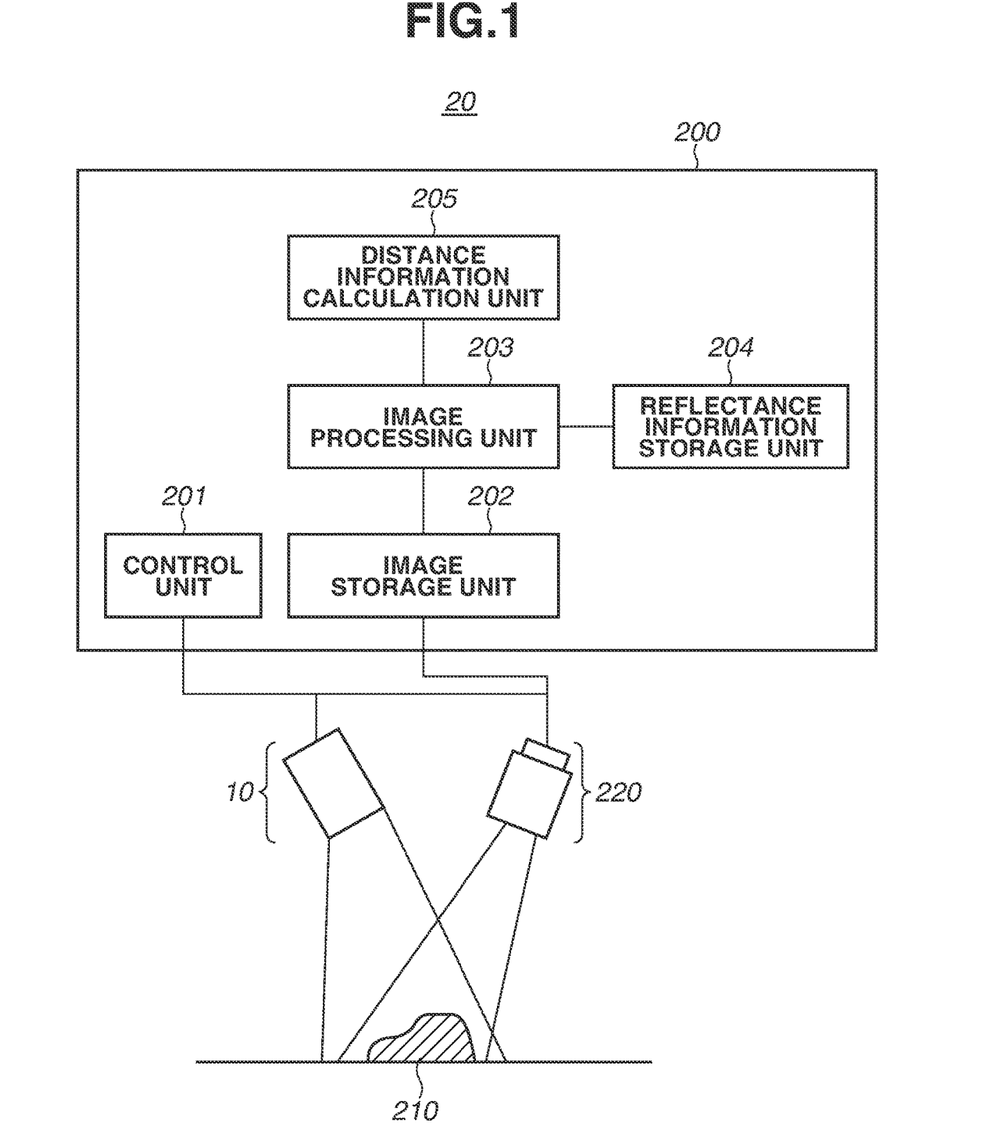
FIG. 1 illustrates a schematic configuration of a measurement apparatus according to a first exemplary embodiment.

FIG. 1 illustrates a configuration of a measurement apparatus 20 according to a first exemplary embodiment. The measurement apparatus 20 measures the shape (for example, a three-dimensional shape, a two-dimensional shape, a position, and an orientation) of an object 210 using the pattern projection method. Examples of the object 210 include a metallic component and an optical member. As illustrated in FIG. 1, the measurement apparatus 20 includes a projection unit 10, an imaging unit 220, and a processing unit 200. More specifically, the measurement apparatus 20 measures the position and orientation of the object by acquiring a distance image (range image) and a uniform illumination image and performing model fitting using the two images. The term "distance image (range image)" as used herein refers to an image which expresses three-dimensional information about points on the surface of the object and each pixel of which has information about a depth, and the term "uniform illumination image" refers to an image obtained by performing imaging on the object illuminated with uniform light. Furthermore, the model fitting is performed on a computer-aided design (CAD) model of a previously created object to be measured, on the assumption that the three-dimensional shape of the object is already known.

Figure 2:
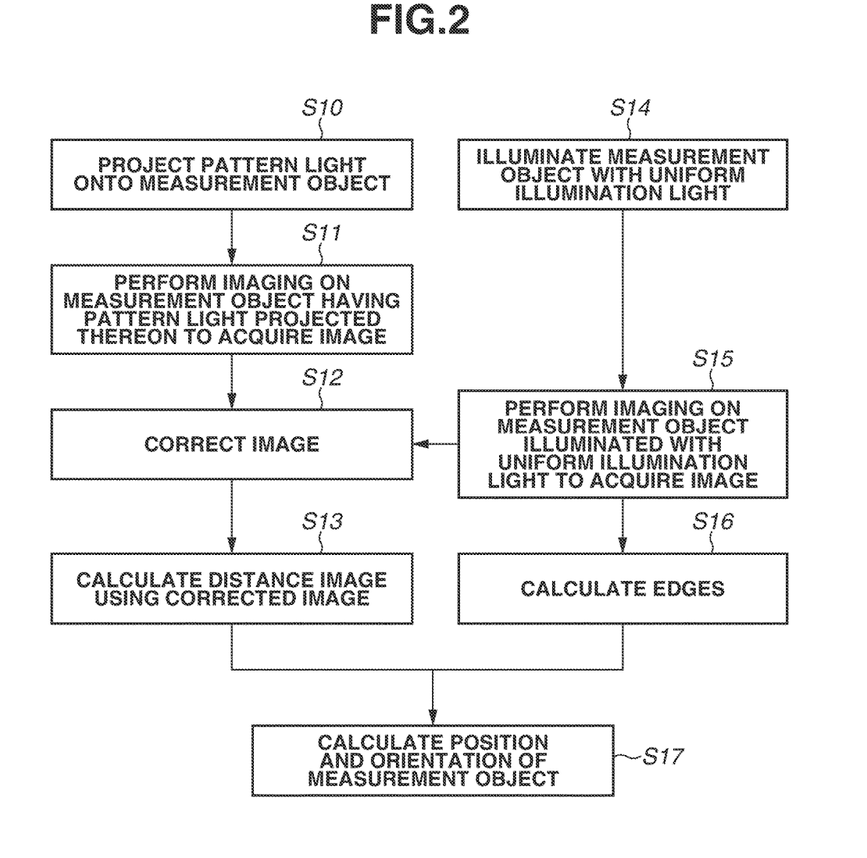
FIG. 2 is a flowchart illustrating measurement according to the first exemplary embodiment.
Figure 3:
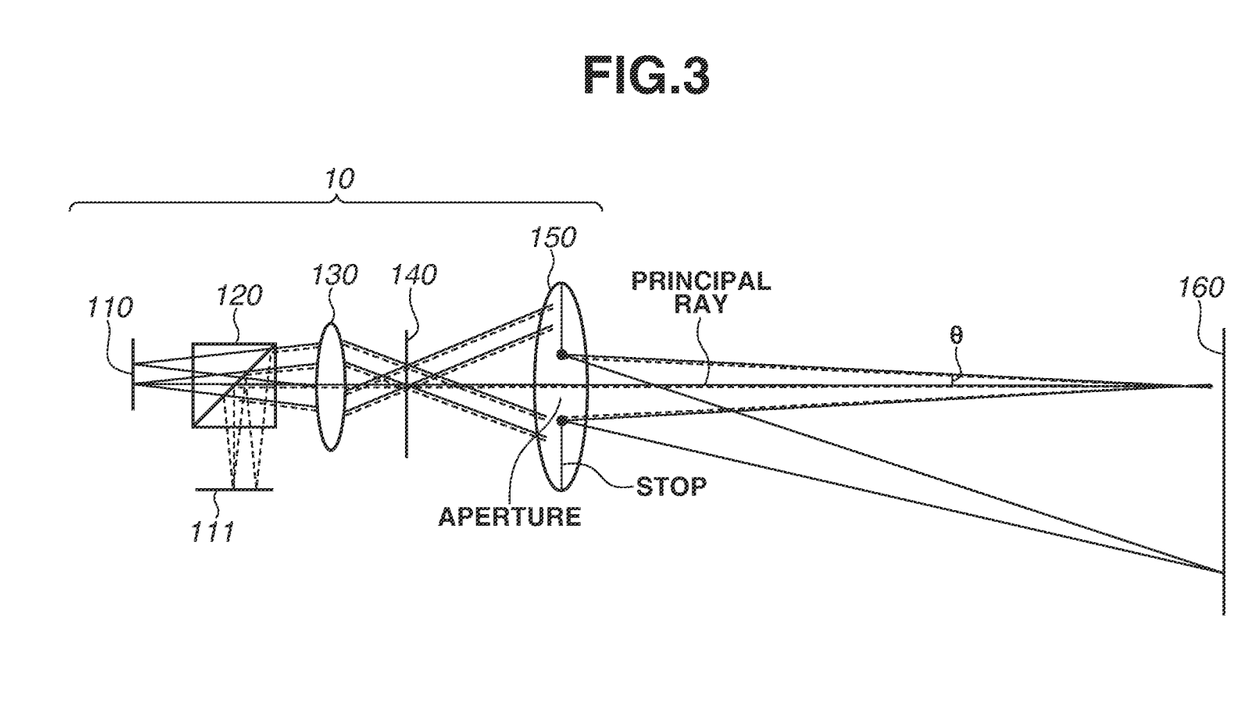
FIG. 3 illustrates a schematic configuration of a projection unit.

FIG. 2 is a flowchart illustrating a measurement method according to the first exemplary embodiment. First, in step S10, the projection unit 10 projects predetermined pattern light onto the object 210. FIG. 3 illustrates a schematic view of the projection unit 10. The projection unit 10 includes two types of light sources. One is a first light source 110 used to acquire a pattern projection image, and the other is a second light source 111 used to acquire a uniform illumination image. These light sources emit two types of non-polarized light having respective different wavelengths. In the following description, a first wavelength of light (indicated by a solid line) emitted from the first light source 110 is denoted by $\lambda 1$, and a second wavelength of light (indicated by a broken line) emitted from the second light source 111 is denoted by $\lambda 2$. Two pieces of light respectively emitted from the two light sources 110 and 111 fall on a half mirror 120 (an optical combining unit). Here, the half mirror 120 is provided to cause two pieces of light respectively emitted from the two light sources 110 and 111 to overlap the same optical axis (to be optically combined). In other words, the half mirror 120 causes an optical path of light from the first light source 110 and an optical path of light from the second light source 111 to be located on the same axis. In the present exemplary embodiment, as illustrated in FIG. 3, light from the first light source 110 for pattern projection passes through the half mirror 120, and light from the second light source 111 for uniform illumination is reflected by the half mirror 120. In step S14, concurrently with projecting the predetermined pattern light onto the object 210, the projection unit 10 illuminates the object 210 with uniform illumination light from the second light source 111.

Two pieces of light, one of which has passed through the half mirror 120 and the other of which has been reflected from the half mirror 120, pass through a lens system 130 and then fall on a pattern light forming unit 140. The pattern light forming unit 140 is designed to function in such a way as to allow only the pattern projection light to be used to form (generate) pattern light. The form of a pattern of the pattern projection light varies depending on measurement methods. In the present exemplary embodiment, the measurement apparatus 20 is assumed to measure the position and orientation of the object while moving a robotic arm containing a unit including the projection unit 10 and the imaging unit 220. Here, the robotic arm (a gripping unit) is configured to grip the object 210 to move or rotate the object 210. Therefore, it is desirable that the pattern light to be projected onto the object be pattern light enabling calculating a distance image from one pattern projection image. This is because another measurement method of calculating a distance image from a plurality of captured images may cause a deviation of the field of view between the captured images due to movement of the robotic arm and is thus unable to precisely calculate a distance image. Examples of the pattern enabling calculating a distance image from one pattern projection image include a dot line pattern in which dots enabling identifying the coordinates are located on each line of a line pattern including a bright portion and a dark portion. The examples further include a line width modulation pattern in which the individual line widths are varied to enable identifying the respective lines. For example, the measurement apparatus 20 can calculate a distance image from one captured image by projecting a dot line pattern onto the object and associating the projection pattern with the captured image based on the positional relationship of the dots. Moreover, the projection pattern is not limited to the above-mentioned example, but can be any pattern as long as it enables calculating a distance image from one pattern projection image.

The following can be considered as a method for implementing the pattern light forming unit 140. There is generally known a wavelength-selective filter having a dielectric multi-layer film that transmits or reflects only light of a specific wavelength. On the other hand, in a case where, for example, a dielectric multi-layer film that transmits other than light of the wavelength $\lambda 1$, which is the wavelength of the pattern projection light, is assumed, when the dielectric multi-layer film is formed on a substrate, a portion of the dielectric multi-layer film corresponding to a bright portion pattern is removed by etching. With this processing, only pattern projection light having the wavelength λ1 forms pattern light, and light having the wavelength λ2 is emitted as illumination light having a uniform light intensity distribution.

The projection unit 10 further includes a projection optical system 150, which is an imaging optical system for forming an image of pattern light formed by the pattern light forming unit 140 on an image plane (a plane of illumination) 160. The position of the pattern light forming unit 140 is a position conjugate to the image plane 160 via the projection optical system 150. The projection optical system 150 is a shared optical system used to perform both projection of pattern light and projection of light from the second light source 111. The projection optical system 150 is composed of, for example, a group of lenses and a mirror, and is an imaging optical system having, for example, a single image forming relation. Since, as mentioned above, principal rays of two types of light, i.e., light (indicated by a solid line) emitted from the first light source 110 and light (indicated by a broken line) emitted from the second light source 111, overlap on the same optical axis, both the two types of light exiting the projection optical system 150 pass through the aperture of a stop on the common pupil plane. As a result, the traveling directions of principal rays of two types of light exiting the projection optical system 150 coincide with each other, and the numerical apertures thereof are also equal to each other. Furthermore, the principal ray is a ray of light that passes through the center of a pupil plane (the center of the aperture of a stop). The numerical aperture is determined by the aperture diameter of a stop located on the pupil plane of the projection optical system 150. The numerical aperture (NA) is defined by "NA=n×sin θ" where "n" is the refractive index and θ is the maximal incidence angle (angle relative to the optical axis) of the on-axial light ray. Moreover, light at a bright portion of pattern projection light and uniform illumination light having the wavelength λ2 are adjusted to have the same light intensity. Hereinafter, this relationship between the two types of light is referred to as "being equal in light distribution characteristic". In other words, light at a bright portion of pattern light and light from the second light source 111, which exit the projection optical system 150, include pieces of light which have the same numerical aperture and the same light intensity and the principal rays of which travel in the same direction.

Figure 4:
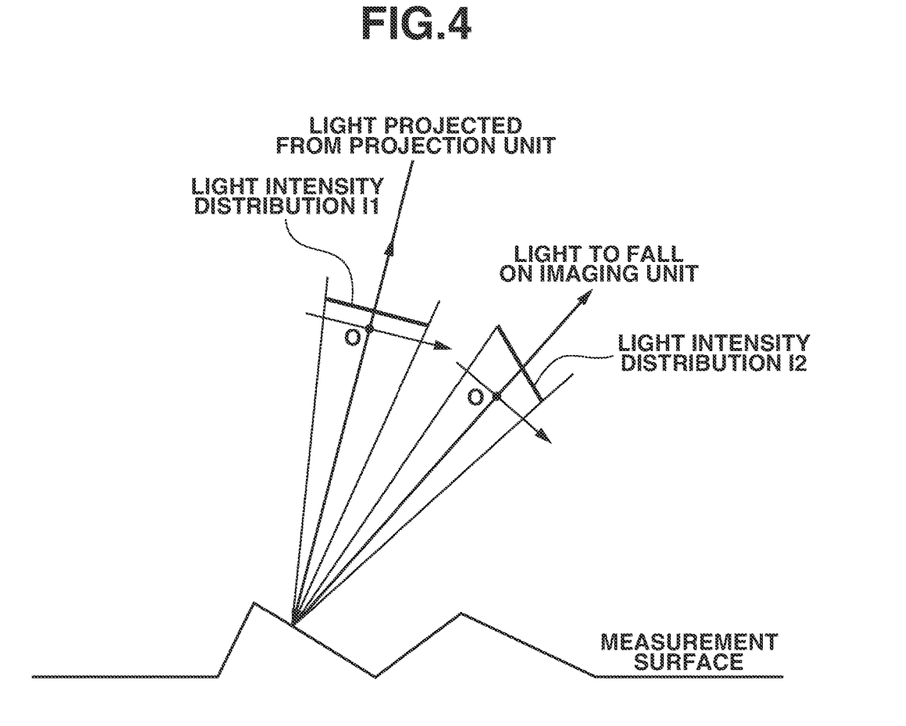
FIG. 4 illustrates a behavior of reflection of light with which the surface of an object to be measured is irradiated.
Figure 5:
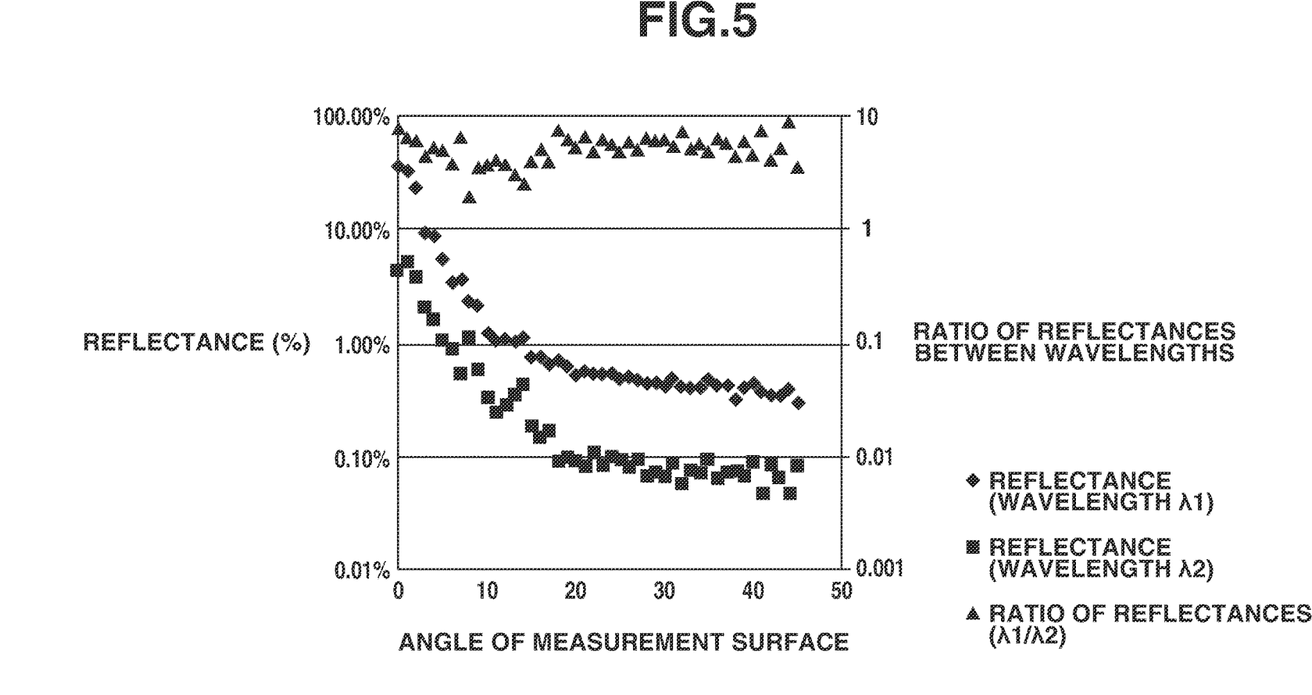
FIG. 5 illustrates the reflectance with respect to the angle of a surface to be measured.

FIG. 4 illustrates a behavior of reflection of light when the surface of an object to be measured (a surface to be measured) is irradiated with light projected from the projection optical system 150. The light intensity distribution I1 of light projected from the projection optical system 150 is assumed to be uniform with the central ray set as the origin. Since light projected from the projection optical system 150 has the angular spreading, the incidence angle of light relative to the surface structure of the object differs among light rays. On the other hand, FIG. 5 illustrates a result of measurement of reflectances of pieces of light having respective different wavelengths with respect to the respective angles of the surface to be measured made from a uniform material. The reflectance as used herein refers to the ratio of the amount of incident light reflected from the surface in a certain direction to the amount of light incident on the surface from a certain direction. For example, the reflectance can be expressed as the ratio of the amount of light reflected in the direction of the imaging unit 220 and then received at the imaging unit 220 to the amount of light incident on the surface. It can be seen that the reflectance depends on the angle of the surface. Thus, the above-mentioned variation in incidence angle among incident light rays causes a change in the light intensity distribution in reflected light. Therefore, the light intensity distribution I2 in reflected light is not uniform with the central ray set as the origin, as illustrated in FIG. 4.

The imaging unit 220, which includes an optical system and an image sensor, performs imaging on the object to capture an image of the object. The optical system of the imaging unit 220 is an imaging optical system for forming an image of light reflected from the object on the image sensor. The image sensor, which includes a plurality of pixels used to perform imaging on the object, is composed of, for example, a complementary metal oxide semiconductor (CMOS) sensor or a charge-coupled device (CCD) sensor. The amount of light at each pixel (pixel value) obtained in the image sensor is a time-integrated value of the amount of light incident on the pixel. In step S11, the imaging unit 220 performs imaging on the object having the pattern light projected thereon to acquire an image of the object formed from the pattern light reflected from the object, in other words, a pattern projection image (first image). Moreover, in step S15, the imaging unit 220 performs imaging on the object illuminated with uniform illumination light having the wavelength λ2 to acquire a uniform illumination image (second image) of the object formed from the illumination light reflected from the object. The above-mentioned illuminating and imaging operations on the two pieces of light are performed in synchronization (at the same timing).

The processing unit 200 obtains the shape of the object based on an image acquired by the imaging unit 220. The processing unit 200, which is composed of a general-purpose computer, operates as an information processing apparatus. The processing unit 200, which is composed of a computation device, such as a central processing unit (CPU), a micro-processing unit (MPU), a digital signal processor (DSP), or a Field Programmable Gate Array (FPGA), includes a storage device, such as a dynamic random access memory (DRAM). The processing unit 200 includes a control unit 201, an image storage unit 202, an image processing unit 203, a distance information calculation unit 205, and a reflectance information storage unit 204. The control unit 201 control operations of the projection unit 10 and the imaging unit 220. More specifically, when the object 210 is irradiated with pattern projection light and uniform illumination light, which has the wavelength λ2, the control unit 201 instructs the imaging unit 220 to perform imaging on the object 210. The above-mentioned illuminating and imaging operations on the two pieces of light are controlled by the control unit 201 to be performed at the same timing. Performing these operations at the same timing enables acquiring a pattern projection image and a uniform illumination image from the same point of view even when the relative position between the object and the imaging unit 220 changes.

The image storage unit 202 stores an image acquired by the imaging unit 220. The imaging unit 220, which includes a wavelength separation configuration, such as a color filter, is capable of separately acquiring a pattern projection image and a uniform illumination image at the same time. The data of the pattern projection image and the uniform illumination image captured at the same time in the above-described way is stored into the image storage unit 202.

The reflectance varies depending on the angle of the surface to be measured, as illustrated in FIG. 5, and the luminance (pixel value) distribution in a pattern projection image includes influences of the reflectance distribution caused by the fine-structure shape (surface roughness) of the surface to be measured. These influences may cause detection errors in detecting the coordinates of a pattern in the pattern projection image or may make it impossible to perform such detection itself, and, as a result, information on the calculated shape of the object to be measured may become less accurate. Therefore, in step S12, the image processing unit 203 corrects the first image using the second image of the object formed from light emitted from the second light source 111 and reflected by the object, which is obtained by the imaging unit 220 performing imaging on the object illuminated with light from the second light source 111. More specifically, the image processing unit 203 acquires information on the ratio of reflectances between the reflectance of light having the first wavelength $\lambda 1$ and the reflectance of light having the second wavelength $\lambda 2$ in the object. Then, the image processing unit 203 converts pixel values of the second image into pixel values in the first wavelength using the information on the ratio of reflectances and then corrects the first image using the converted pixel values of the second image.

Specific examples of the information on the ratio of reflectances include information on the ratio of reflectances between wavelengths with respect to a certain subject material, as illustrated in FIG. 5. Referring to FIG. 5, although the reflectance varies depending on the angle of the surface to be measured in both the two wavelengths, the ratio of reflectances between the two wavelengths is low in the dependency on the angle of the surface. Accordingly, even if the angles of the surface are unknown, by dividing the luminance distribution of a uniform illumination image captured with light of the wavelength $\lambda 2$ by the ratio of reflectances between the two wavelengths, the image processing unit 203 can convert that luminance distribution into a luminance distribution of a uniform illumination image that would be captured with light of the wavelength $\lambda 1$. With the above-described conversion, the converted luminance distribution of a uniform illumination image in the wavelength $\lambda 1$ becomes similar to the luminance distribution of an image captured with pattern light of the wavelength $\lambda 1$. Therefore, the image processing unit 203 performs image correction to subtract, from the luminance distribution of a pattern projection image, the above converted luminance distribution of a uniform illumination image that would be captured with light of the wavelength $\lambda 1$. Furthermore, the image correction can be arithmetic division. In doing so, the image processing unit 203 is able to reduce influences (errors) of luminance caused by the fine-structure shape of the object present in a pattern projection image.

Here, the information on the ratio of reflectances can be previously stored in the reflectance information storage unit 204 or can be acquired by the measurement apparatus 20 performing actual reflectance measurement before performing distance measurement using pattern projection light. In the case of performing reflectance measurement, the measurement apparatus 20 can perform such measurement by illuminating the object with uniform light containing light of the wavelength $\lambda 1$ and light of the wavelength $\lambda 2$ while removing a pattern generation function by, for example, switching the pattern light forming unit 140.

Data of the corrected pattern projection image is transmitted to the distance information calculation unit 205. In step S13, the distance information calculation unit 205 obtains information on the shape of the object based on the image corrected by the image processing unit 203. More specifically, the distance information calculation unit 205 obtains the coordinates of a pattern, i.e., the position of pattern light in the image, by detecting the peaks, edges, and dots of pattern light in the corrected image (a position targeted for detection). Then, the image processing unit 203 calculates a distance image (three-dimensional information) of the object at each pixel position according to the principle of triangulation using information on the position (coordinates) targeted for detection and indices of the respective lines identified by the dots. The distance information (distance image) calculated here is high-precision distance information in which any detection errors caused by the fine-structure shape of the object have been reduced.

Furthermore, in step S16, the processing unit 200 calculates edges by edge detection processing using the obtained uniform illumination image. Then, in step S17, the processing unit 200 obtains the position and orientation of the object using results of calculation in steps S13 and S16. More specifically, the processing unit 200 acquires a distance image and a uniform illumination image and performs model fitting using the two images, thus measuring the position and orientation of the object. Moreover, the model fitting is performed on a CAD model of a previously created object to be measured, on the assumption that the three-dimensional shape of the object is already known.

Figure 8:
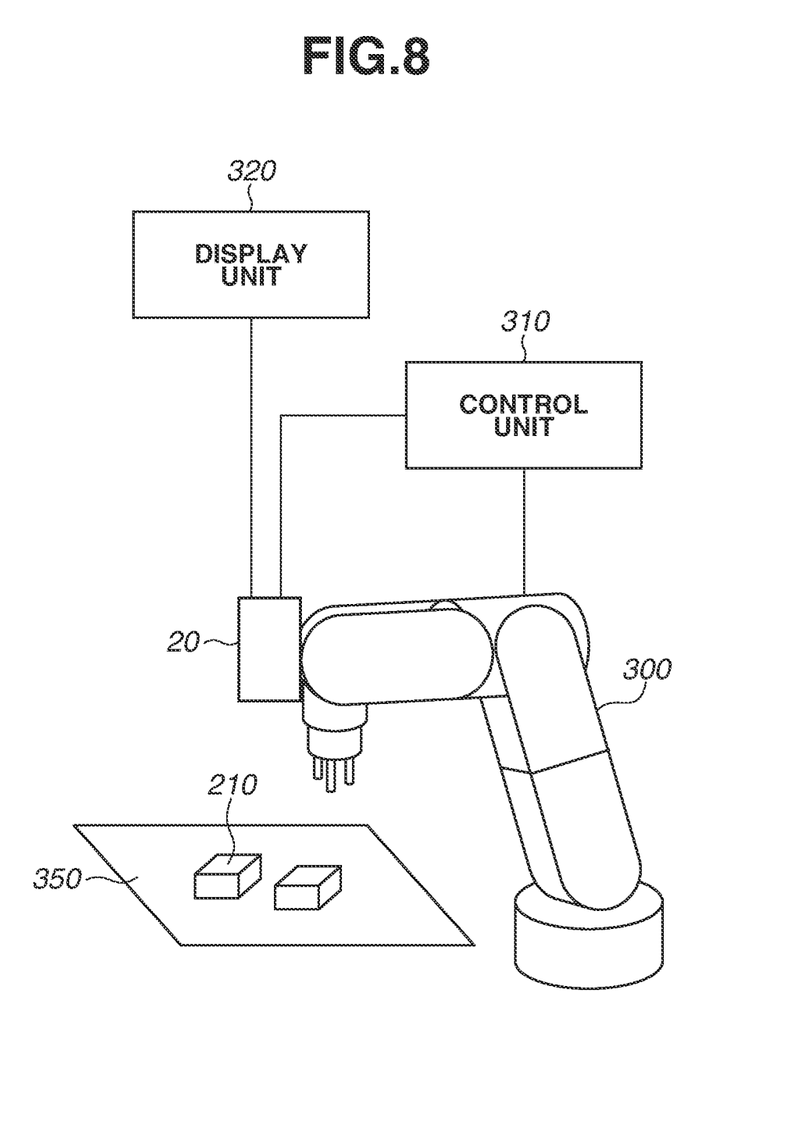
FIG. 8 illustrates a system including a measurement apparatus and a robot.

The measurement apparatus 20 according to the present exemplary embodiment is assumed to be mounted on a robotic arm 300, as illustrated in FIG. 8. Therefore, when the measurement apparatus 20 has obtained the position and orientation of the object 210 placed on a support base 350, a control unit 310 for the robotic arm 300 controls the robotic arm 300 using a result of measurement of the position and orientation of the object 210. More specifically, for example, the robotic arm 300 moves, rotates, or grips the object 210. The control unit 310 includes a computation device, such as a CPU, and a storage device, such as a memory. Furthermore, measurement data measured by or images obtained by the measurement apparatus 20 can be displayed on a display unit 320, such as a display device.

According to the above-described exemplary embodiment, a pattern projection image can be easily corrected with precision using a uniform illumination image. Accordingly, even in a case where the relative position between the object and an imaging unit varies, any detection errors caused by the fine-structure shape of the surface of the object can be reduced, so that information on the shape of the object can be more precisely obtained.

Figure 6:
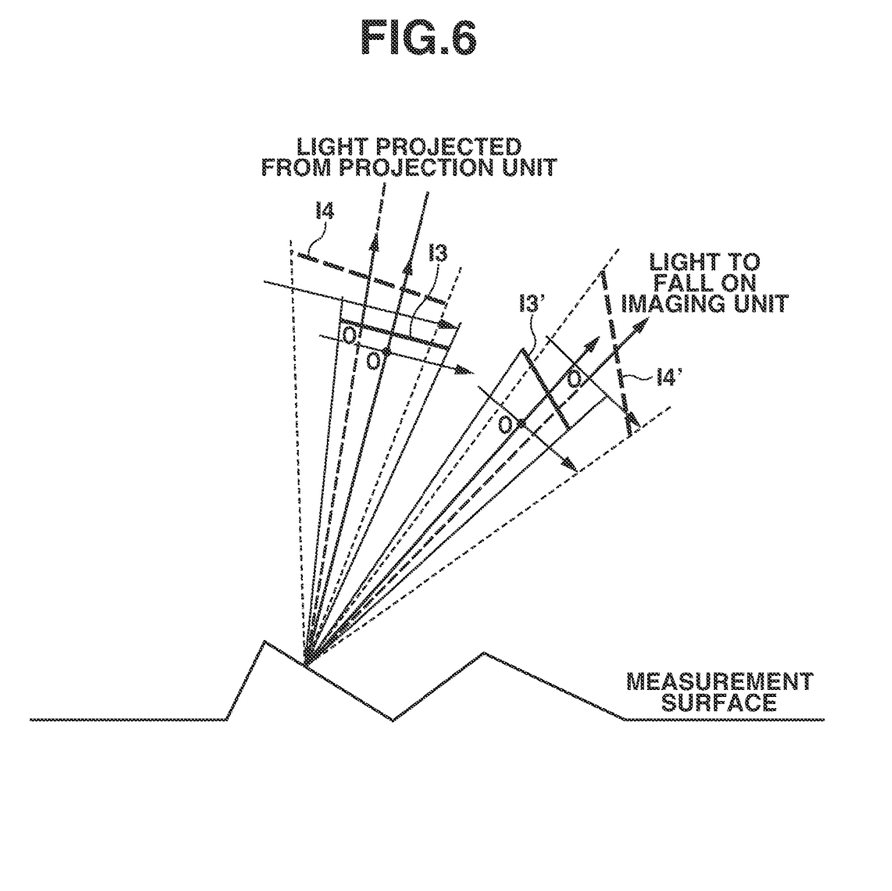
FIG. 6 illustrates a behavior of reflection of light with which the surface of an object to be measured is irradiated when the traveling direction of a principal ray of the light varies.

Here, FIG. 6 illustrates, as a comparative example, a behavior of reflection when the surface of the object is irradiated with two pieces of light different in the traveling direction of a principal ray thereof. The two pieces of light are assumed to be the same in the numerical aperture and the intensity distribution of incident light. In FIG. 6, the optical path and the intensity distribution I3 of one light are indicated by a solid line, and the optical path and the intensity distribution I4 of the other light are indicated by a broken line. The difference in the traveling direction of a principal ray causes the incidence angle and the reflectance on the surface of the object to differ between the two pieces of light throughout the entire light flux. For example, when one light falls on the surface of the object at angles of 5 degrees to 15 degrees and the other light falls on the surface of the object at angles of 3 degrees to 10 degrees, the reflectance distributions thereof differ as illustrated in FIG. 6. The light intensity distribution obtained when one light has been reflected from the surface of the object is indicated by I3', while the light intensity distribution obtained when the other light has been reflected from the surface of the object is indicated by I4'. As a result, the distribution of the amount of received light detected by an imaging unit also differs between two pieces of light. Therefore, it is impossible to precisely correct, with respect to the amount of light of an image captured with one illumination light, the amount of light of an image captured with other illumination light different in the traveling direction of a principal ray thereof.

Figure 7:
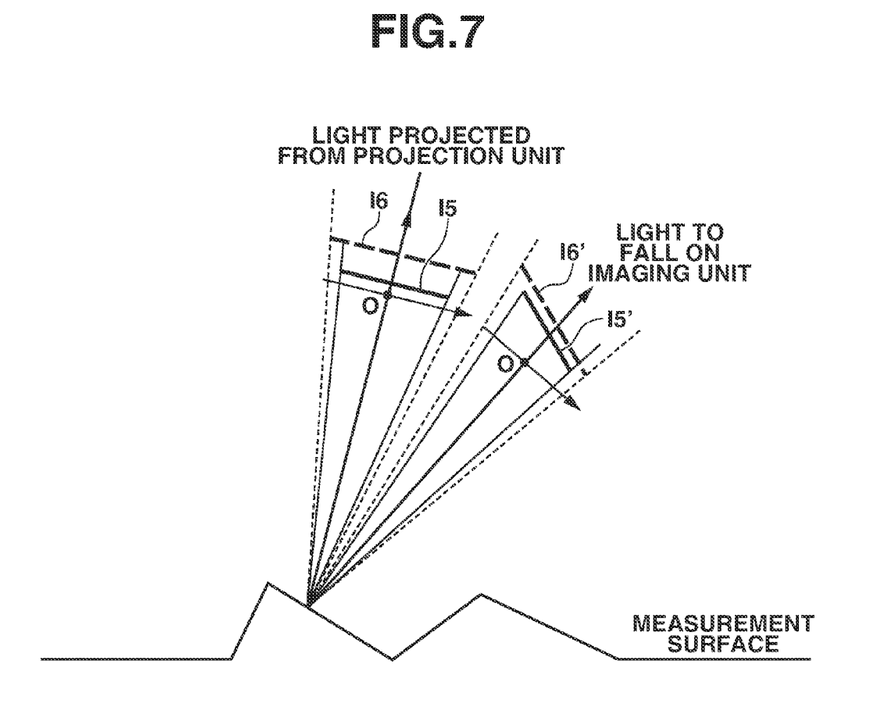
FIG. 7 illustrates a behavior of reflection of light with which the surface of an object to be measured is irradiated when the numerical aperture varies.

Furthermore, FIG. 7 illustrates a behavior of reflection when the surface of the object to be measured is irradiated with two pieces of light different in the numerical aperture thereof. The two pieces of light are assumed to be the same in the traveling direction of a principal ray thereof and the intensity distribution of incident light. In FIG. 7, the optical path and the intensity distribution I5 of one light are indicated by a solid line, and the optical path and the intensity distribution I6 of the other light are indicated by a broken line. The difference in the numerical aperture causes the incidence angle and the reflectance on the surface of the object to differ between the two pieces of light throughout the entire light flux. For example, when one light falls on the surface of the object at angles of 5 degrees to 10 degrees and the other light falls on the surface of the object at angles of 3 degrees to 12 degrees, the reflectance distributions thereof differ as apparent from FIG. 7. The light intensity distribution obtained when one light has been reflected from the surface of the object is indicated by I5', while the light intensity distribution obtained when the other light has been reflected from the surface of the object is indicated by I6'. As a result, the distribution of the amount of received light detected by the imaging unit also differs between two pieces of light. Therefore, it is impossible to precisely correct, with respect to the amount of light of an image captured with one illumination light, the amount of light of an image captured with other illumination light different in the numerical aperture thereof. Moreover, with regard to an image captured by irradiating the surface of the object with two pieces of light different in the light intensity distribution, which are projected onto (used to illuminate) the surface to be measured, it is also impossible to precisely correct an image captured with one illumination light using an image captured with the other illumination light.

Therefore, to perform high-precision image correction, two pieces of light need to be equal in the traveling direction of a principal ray, the numerical aperture, and the light intensity distribution thereof. In other words, two pieces of light need to be equal in light distribution characteristic. In a case where the surface of the object is irradiated with two pieces of light equal in light distribution characteristic, the incidence angle distribution and the reflectance distribution of the entire light flux with respect to the surface of the object become equal. As a result, since the distribution of the amount of received light detected by the imaging unit is equal between two pieces of light, the influences of the amount of received light at the imaging unit, which are caused by the fine-structure shape, can be precisely corrected.

With regard to measurement using pattern projection light and uniform illumination light, consider a case where the difference in polarization direction between two pieces of light is 90 degrees, as discussed in Japanese Patent Application Laid-Open No. 2002-213931. There may be some objects to be measured having a reflectance difference depending on different polarization directions. In a case where images of such the object are captured with two pieces of light different in polarization direction and image correction is performed based on a difference between the captured images, the correction accuracy would become low due to the reflectance difference caused by the difference in polarization direction. Furthermore, any inclination of the incidence angle caused by the fine-structure shape of the surface of the object may cause various changes in the polarization state depending on positions on the surface to be measured. These changes may cause one captured image to be mixed with a crosstalk component of the other captured image, so that a decrease in the correction accuracy may occur.

According to the above-described exemplary embodiment, a pattern projection image and a uniform illumination image are obtained by illuminating the object with pattern projection light and uniform illumination light, which are different in wavelength but are equal in light distribution characteristic, and capturing an image of the object having irradiated with the pattern projection light and the uniform illumination light, and image correction is performed on the pattern projection image using the uniform illumination image. In this case, a decrease in correction accuracy, which is caused by the differences in polarization direction and light distribution characteristic as mentioned in the foregoing, does not occur. Only a reflectance difference caused by wavelengths influences a difference in the amount of received light between the two pieces of light. The influence of the reflectance difference caused by a wavelength difference is reduced by the above-described process. Thus, high-precision information on the shape of the object can be calculated.

Next, a second exemplary embodiment of the present invention is described. The pattern light forming unit 140 can be implemented by selectively locating a micro-structure member having a wavelength selection function according to patterns. Examples of the micro-structure member include a photonic liquid crystal. The photonic liquid crystal includes a micro-structure member the refractive index of which varies at a period equal to or less than the wavelength of incident light, and is able to reflect or transmit only light of a specific wavelength in consonance with a periodic change in refractive index. The photonic liquid crystal is formed by drawing a pattern on a photosensitizing agent coated on a substrate using electron beams and then performing developing and etching. For example, a micro-structure member that selectively reflects pattern projection light of wavelength $\lambda 1$ is located only at a portion corresponding to a pattern dark portion of the pattern projection light on a substrate having light transmission properties, so that pattern projection light of wavelength $\lambda 1$ and uniform illumination light of wavelength $\lambda 2$ can be obtained. When measurement is performed in the same process as in the first exemplary embodiment using the pattern light forming unit 140, which includes the above micro-structure member, high-precision shape information can be calculated.

While various exemplary embodiments of the present invention have been described above, the present invention is not limited to those exemplary embodiments, but can be altered or modified in various manners. An exemplary embodiment obtained by combining the above-described exemplary embodiments can be available. Although, in the above-described exemplary embodiments, light from a first light source and light from a second light source are optically combined by the half mirror 120 at the side closer to the light sources than the pattern light forming unit 140, this is not limiting. For example, two pieces of light from the two light sources can be optically combined by the pattern light forming unit 140. In this case, the pattern light forming unit 140 does not need to contain a material the transmittance of which varies depending on wavelengths. Furthermore, the pattern light forming unit 140 can be mounted just behind or inside the projection optical system 150. Moreover, although, in the above-described exemplary embodiments, light emitted from each of the first light source 110 and the second light source 111 is non-polarized light, this is not limiting. For example, linearly-polarized light having the same polarization direction can be used as long as it is polarized light having the same polarization state. Additionally, the measurement apparatus 20 described above can also be applied to a measurement apparatus that performs measurement using a plurality of robotic arms each having an imaging unit or to a measurement apparatus that includes an imaging unit mounted on a fixed support member. Furthermore, the measurement apparatus 20 can be mounted on not only a robotic arm but also a fixed support structure. Moreover, an article, such as an optical component or a device unit, can be produced by using data of the shape of the object measured by the measurement apparatus 20 to perform processing, such as treatment, transformation, and assembling, on the object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-138157 filed Jul. 9, 2015, which is hereby incorporated by reference herein in its entirety.

What is claimed is:

1. A measurement apparatus for measuring a shape of an object, the measurement apparatus comprising:
   a first light source configured to emit light of a first wavelength;
   a second light source configured to emit light of a second wavelength different from the first wavelength;
   an optical combining unit configured to optically combine light from the first light source and light from the second light source;
   a forming unit configured to form pattern light using light from the first light source;
   a projection optical system configured to project the optically combined light onto the object;
   an imaging unit configured to image the object on which the pattern light is projected by the projection optical system to capture a first image of the object; and
   a processing unit configured to obtain information of a shape of the object based on the first image,
   wherein the projection optical system is a common optical system configured to perform projection of light from the first light source and projection of light from the second light source,
   wherein the imaging unit images the object illuminated with light from the second light source via the projection optical system to capture a second image of the object, and
   wherein the processing unit corrects the first image using the second image and obtains information on the shape of the object based on the corrected first image,
   wherein the processing unit acquires information on a ratio of reflectances between a reflectance of light of the first wavelength and a reflectance of light of the second wavelength on the object, and
   wherein the processing unit converts pixel values of the second image into pixel values in the first wavelength using the information on the ratio of reflectances, corrects the first image using the converted pixel values of the second image, and obtains information of the shape of the object based on the corrected first image.

2. The measurement apparatus according to claim 1, wherein the pattern light and light from the second light source pass through an aperture of a stop of the projection optical system before projecting onto the object.

3. The measurement apparatus according to claim 1, wherein light at a bright portion of the pattern light and light from the second light source, which are projected from the projection optical system, individually include pieces of light equal in light intensity and equal in direction of a principal ray.

4. The measurement apparatus according to claim 1, wherein an optical path of light from the first light source and an optical path of light from the second light source extend on a common axis by the optical combining unit.

5. The measurement apparatus according to claim 1, wherein the light from the first light source and the light from the second light source optically combined by the optical combining unit fall on the forming unit, and
   wherein the forming unit includes a pattern having a transmittance varying depending on light of the first wavelength and light of the second wavelength.

6. The measurement apparatus according to claim 5, wherein the pattern included in the forming unit includes a pattern made from a dielectric multi-layer film.

7. The measurement apparatus according to claim 5, wherein the pattern included in the forming unit includes a micro-structure member a refractive index varying at a period equal to or less than a wavelength of incident light.

8. The measurement apparatus according to claim 7, wherein the micro-structure member includes a photonic liquid crystal.

9. The measurement apparatus according to claim 1, wherein the imaging unit performs imaging on the object with the pattern light reflected by the object and imaging on the object with the light emitted from the second light source and reflected by the object in synchronization with each other.

10. The measurement apparatus according to claim 1, wherein a polarization state of light from the first light source and a polarization state of light from the second light source are equal.

11. A system that grips and moves an object, the system comprising:
    the measurement apparatus according to claim 1 for measuring a shape of the object;
    a grip unit configured to grip the object; and
    a control unit configured to control the grip unit,
    wherein the control unit controls the grip unit using a result of measurement of the object by the measurement apparatus.

12. A method for producing an article, the method comprising:
    measuring the shape of the object using the measurement apparatus according to claim 1; and
    producing the article by processing the object using a result of measurement of the object by the measurement apparatus.

13. The measurement apparatus according to claim 1, wherein the object has a reflectance distribution on a surface of the object, and
    wherein the first image and the second image include information of the reflectance distribution.

* * * * *